United States Patent
Alshehri et al.

(10) Patent No.: US 9,193,834 B2
(45) Date of Patent: Nov. 24, 2015

(54) PHOSPHAZENE-FORMALDEHYDE POLYMERS AND THEIR POLYMER METAL-COMPLEXES

(75) Inventors: Saad M. Alshehri, Riyadh (SA); Tansir Ahamad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 309 days.

(21) Appl. No.: 13/825,121

(22) PCT Filed: Oct. 4, 2010

(86) PCT No.: PCT/IB2010/054458
§ 371 (c)(1),
(2), (4) Date: Mar. 19, 2013

(87) PCT Pub. No.: WO2012/046095
PCT Pub. Date: Apr. 12, 2012

(65) Prior Publication Data
US 2013/0184405 A1    Jul. 18, 2013

(51) Int. Cl.
*C08G 12/42*    (2006.01)
*C08G 79/02*    (2006.01)

(52) U.S. Cl.
CPC ............. *C08G 79/025* (2013.01); *C08G 79/02* (2013.01)

(58) Field of Classification Search
CPC ................. C08G 79/02; C08G 79/025

USPC .......................................................... 524/597
See application file for complete search history.

(56) References Cited

U.S. PATENT DOCUMENTS

| 2,814,573 | A | * | 11/1957 | Reeves | D06M 13/285 106/18.14 |
|---|---|---|---|---|---|
| 3,164,556 | A | * | 1/1965 | Apley | C08G 79/025 528/381 |
| 3,711,542 | A | | 1/1973 | Hook et al. | |
| 3,867,186 | A | * | 2/1975 | Hook et al. | 442/142 |
| 4,618,691 | A | * | 10/1986 | Medina | C01B 21/097 435/227 |
| 4,668,589 | A | | 5/1987 | Kumar et al. | |
| 5,286,469 | A | * | 2/1994 | Davies et al. | 423/302 |
| H1309 | H | | 5/1994 | Allen et al. | |
| 5,698,664 | A | * | 12/1997 | Allcock | C08G 79/025 525/538 |
| 2004/0011252 | A1 | | 1/2004 | Sturgill et al. | |

OTHER PUBLICATIONS

Allcock et al., "Hydrolysis pathways for aminophosphazenes", Inorganic Chemistry (1982), vol. 21, Iss. 2, pp. 515-521.

* cited by examiner

*Primary Examiner* — Jane L Stanley
(74) *Attorney, Agent, or Firm* — Richard C. Litman

(57) ABSTRACT

Phosphazene-formaldehyde polymeric and phosphazene-formaldehyde metal polymeric compounds and methods for their preparation are described. In one aspect, a phosphazene-formaldehyde polymer is formed by reacting hexaminocyclotriphosphazene hexammoniumchloride, $[\{NP(NH_2)_2\}_3 \cdot 6NH_4Cl]$, and formaldehyde, HCHO, in an aqueous environment to form a reaction product.

20 Claims, 5 Drawing Sheets

US 9,193,834 B2

PHOSPHAZENE-FORMALDEHYDE POLYMERS AND THEIR POLYMER METAL-COMPLEXES

BACKGROUND

Industries seek novel materials that have desirable physical and chemical properties for their commercial applications. Materials that have economical, straightforward production processes from accessible starting materials are especially desirable. Additionally, industries look to the high thermal capacity and stability of the materials as advantageous for their applications.

SUMMARY

Phosphazene-formaldehyde polymeric and phosphazene-formaldehyde metal polymeric compounds and methods for their preparation are described. In one aspect, a phosphazene-formaldehyde polymer is formed by reacting hexaminocyclotriphosphazene hexammonium chloride, $[\{NP(NH_2)_2\}_3 \cdot 6NH_4Cl]$, and formaldehyde, HCHO, in an aqueous environment to form a reaction product. These compounds have multiple functions including use as a thermal resistant coating. An exemplary use for a thermal resistant coating is in aerospace research and modeling.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Incorporating phosphazene into a polymer typically increases its heat resistant properties. Cyclic phosphazene trimmers have been incorporated into polymeric backbones. For example, polymers have been obtained by incorporating a sulfonamide-bearing phenolic compound into a phosphazene-functionalized compound in combination with co-substituents or by itself. However, applications of the polymers prepared by this method are limited because of the generation of corrosive hydrochloric gas during synthesis. In another example, a high heat resistant resin is obtained by polymerization of a phosphonitrilic chloride trimmer into which a substituent containing a malemide group has been introduced. Although this resin is said to have superior heat resistance and to exhibit a high weight restored ratio upon heat decomposition, there are many drawbacks to this material.

For example, the process for synthesizing the raw material derivative is generally considered complicated because it is a multi-step reaction that decreases the product yield and occurs at high temperatures (285° C. to 300° C.). Additionally, the resulting resin has an extremely deep tar black color, making it somewhat limited in practical applications such as surface coating, paint technology, and fillers in different environments. Moreover, the mechanical characteristics of the resulting resin are generally not considered satisfactory, and a high temperature is required for the polymerization. Clearly, such conventional processes generally produce polymers that do not exhibit a combination of superior heat resistance with desirable mechanical characteristics, for example, flexural strength (40,030 psi), flexural modulus, tensile strength (21, 315 psi), and elastic tensile modulus.

In contrast to conventional processes for producing phosphazene polymers, the exemplary phosphazene-formaldehyde polymers and their polymer metal complexes and method of their production described herein in reference to FIGS. 1 through 7 provide a straightforward procedure to generate polymers with both superior heat resistance properties and a high weight residual ratio upon heat decomposition. In one aspect, and as described in greater detail below, the method provides for synthesis of phosphazene-formaldehyde polymers by a dehydration-condensation reaction of hexaminocyclotriphosphazene hexammonium chloride with formaldehyde at room temperature and in different molar ratios.

Exemplary Procedure for Creatine a Phosphazene-Formaldehyde Polymer

Figure 1:
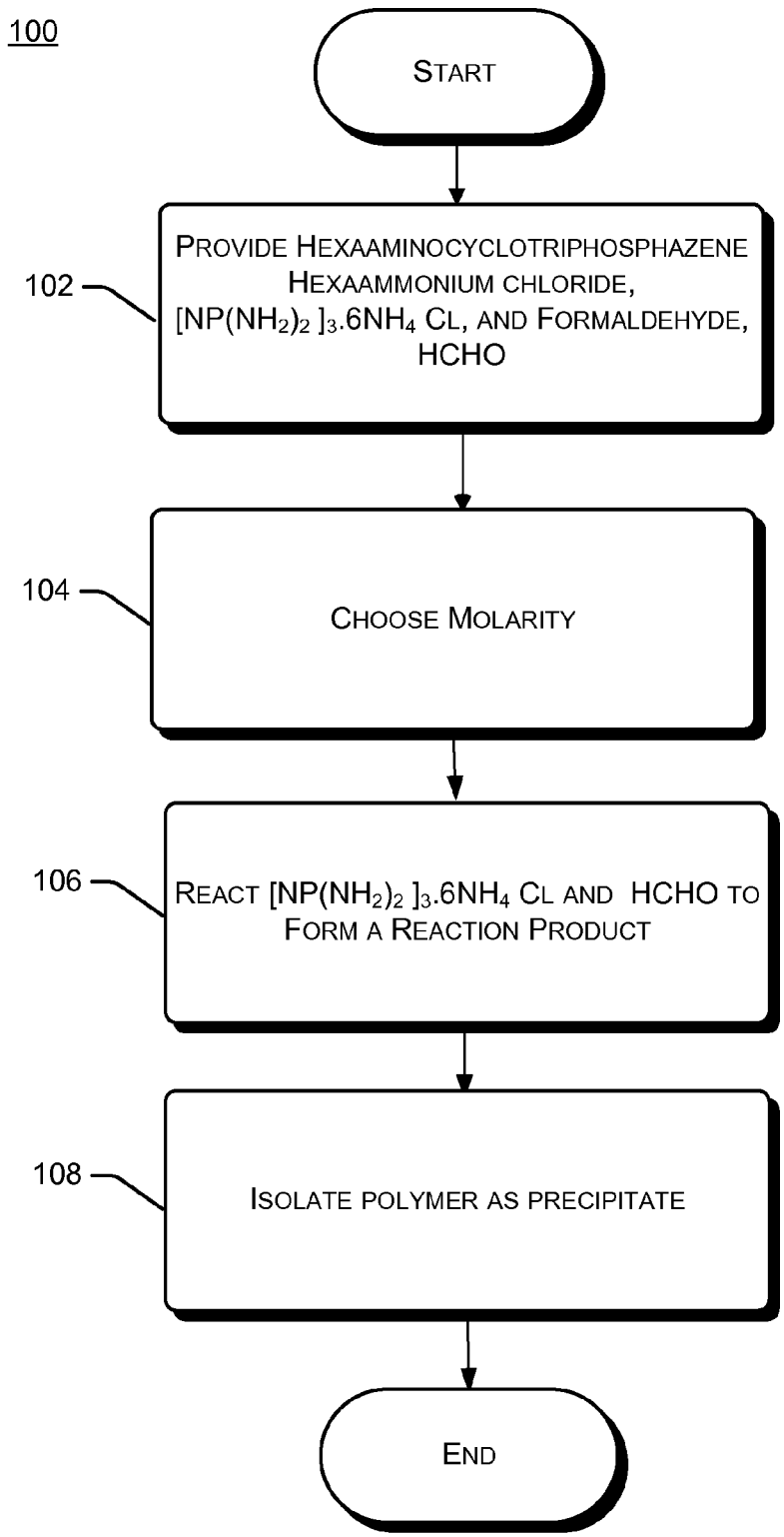
FIG. 1 shows an exemplary procedure for creating a phosphazene-formaldehyde polymer, according to one embodiment.

FIG. 1 shows an exemplary procedure 100 for creating a phosphazene-formaldehyde polymer, according to one embodiment. At block 102, hexaminocyclotriphosphazene hexammonium chloride, $[\{NP(NH_2)_2\}_3 \cdot 6NH_4Cl]$, and formaldehyde, HCHO, are provided. At block 104, a molarity is selected. In one implementation, the molarity is 1:1 molar ratio. Other exemplary embodiments include molar ratios of 1:3 and 1:6. Other molar ratios also can be chosen. Different molar ratios may affect the polymer structure. At block 106, the reactants are reacted in an aqueous environment to form a reaction product. At block 108, the precipitate is isolated to get the desired polymer. In one exemplary embodiment, this reaction takes place in 10 minutes.

Figure 2:
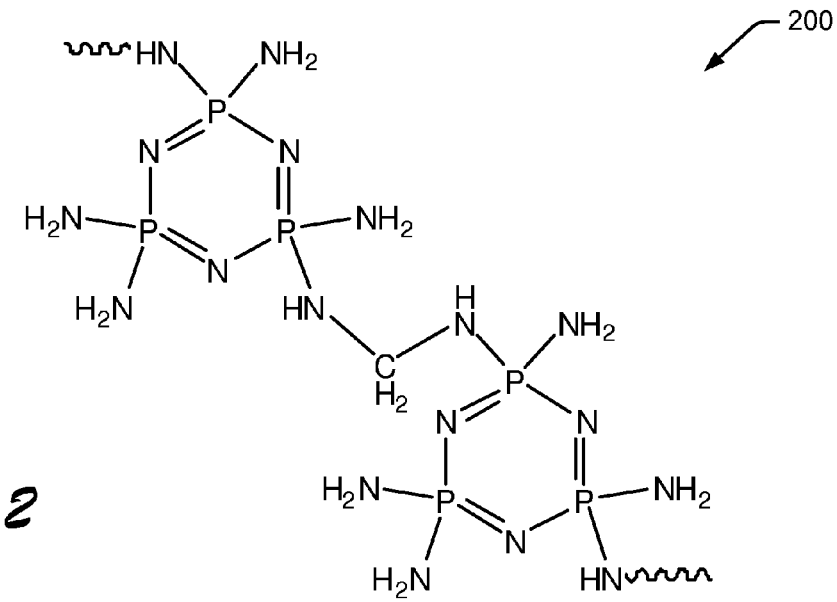
FIG. 2 shows an exemplary phosphazene-formaldehyde polymer formed at a 1:1 molar ratio, according to one embodiment.
Figure 3:
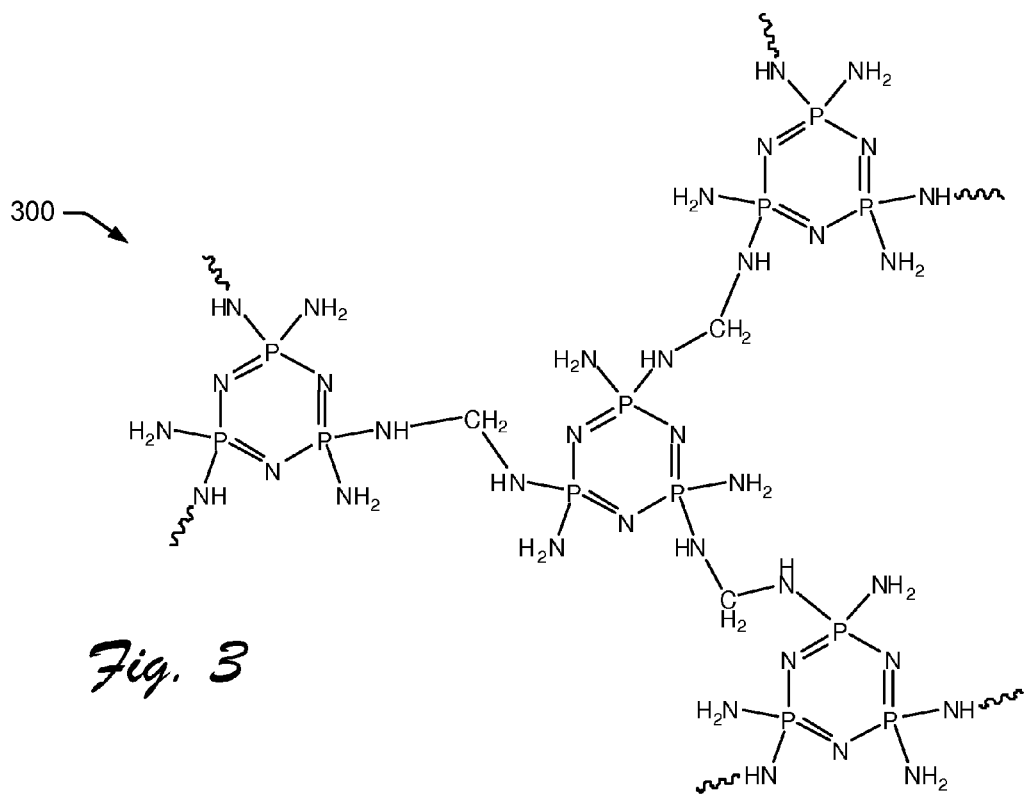
FIG. 3 shows an exemplary phosphazene-formaldehyde polymer formed at a 1:3 molar ratio, according to one embodiment.
Figure 4:
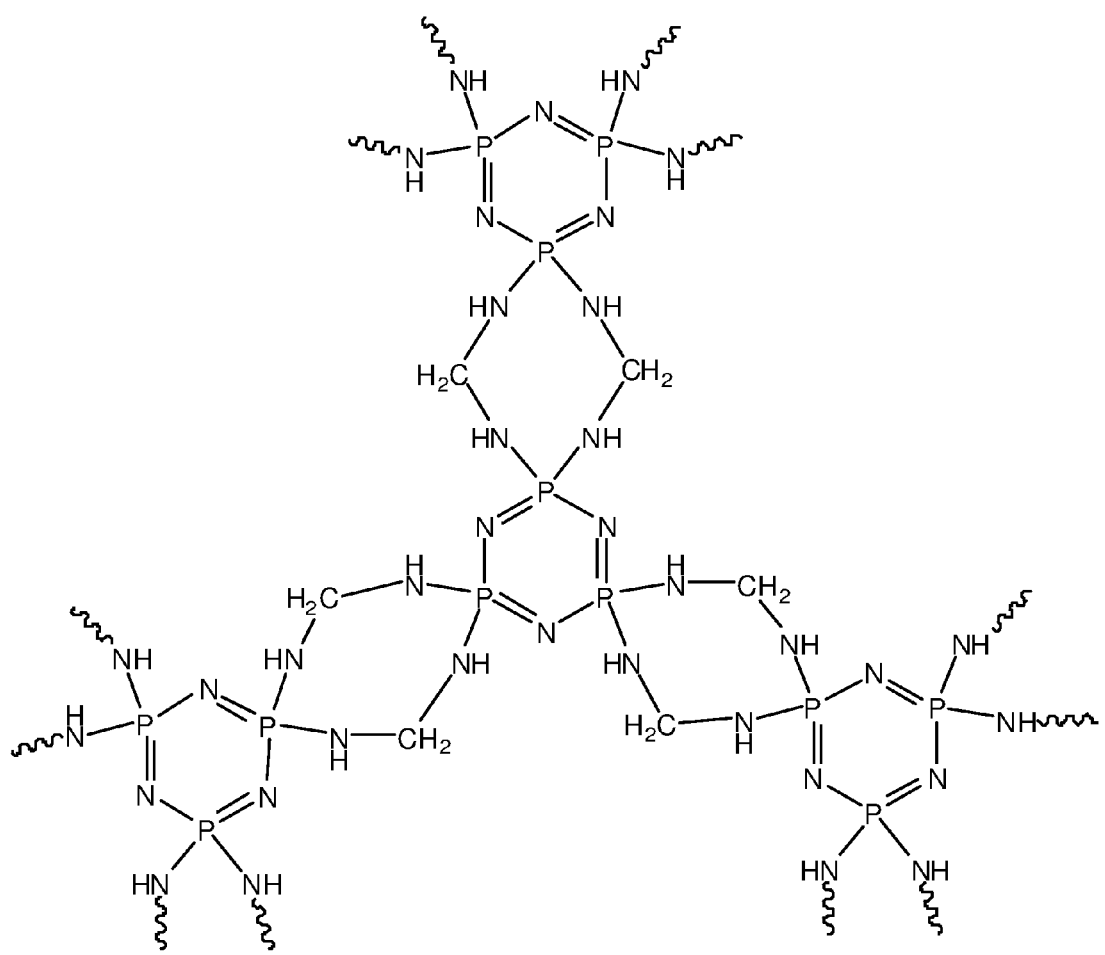
FIG. 4 shows an exemplary phosphazene-formaldehyde polymer formed at a 1:6 molar ratio, according to one embodiment.

FIGS. 2-4 show polymers resulting from different molar ratios used in the process in FIG. 1. More particularly, FIG. 2 shows an exemplary polymer formed when reacting at a 1:1 molar ratio. FIG. 3 shows an exemplary polymer formed when reacting at a 1:3 molar ratio. Finally, FIG. 4 shows an exemplary polymer formed when reacting at a 1:6 molar ratio.

Procedures for Creatine a Phosphazene-Formaldehyde Metal Polymer

Figure 5:
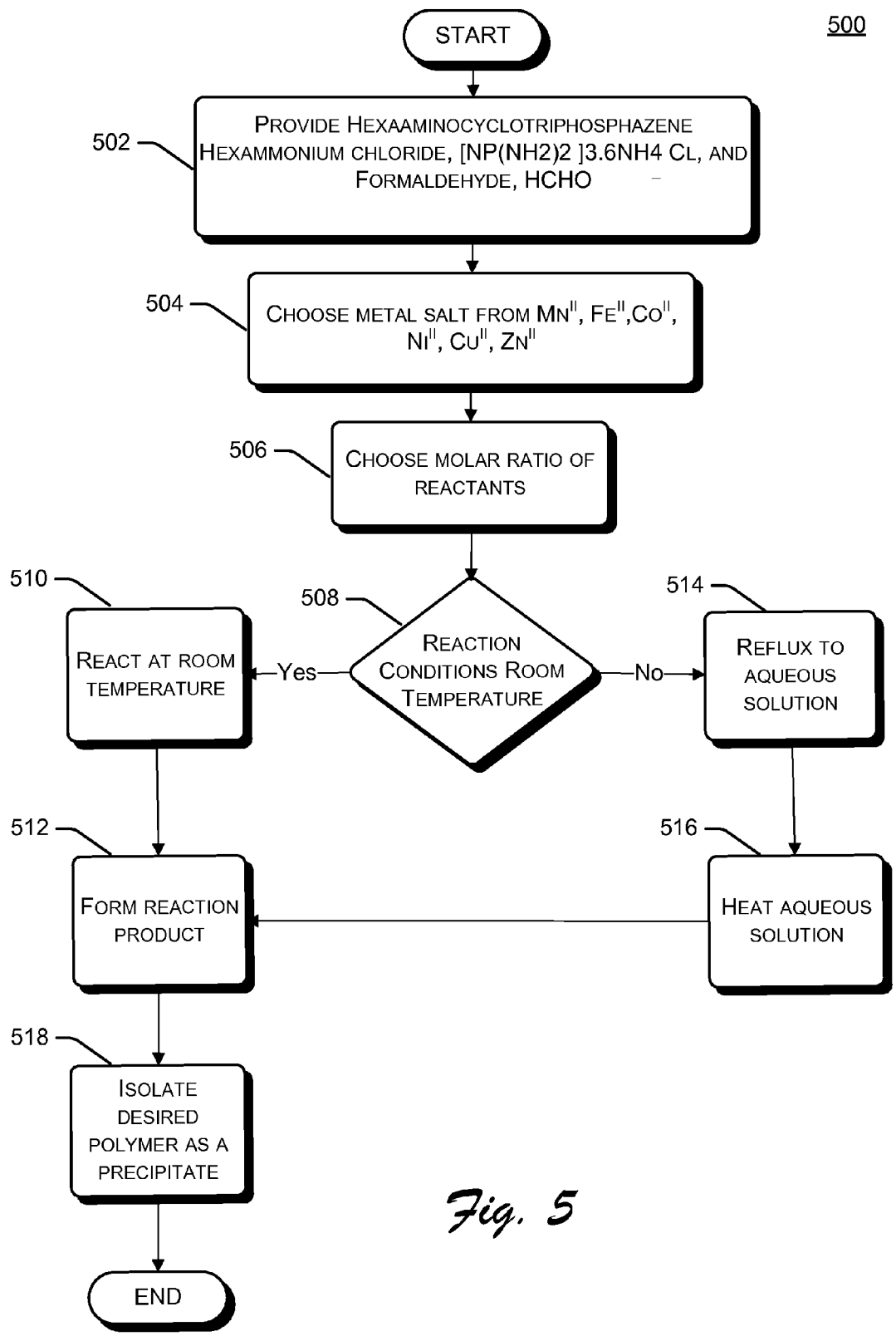
FIG. 5 shows an exemplary procedure for creating of phosphazene-formaldehyde metal polymer, according to one embodiment.

FIG. 5 shows an exemplary procedure 500 to create a phosphazene-formaldehyde metal polymer, according to one embodiment. Referring to block 502, the procedure forms the base polymer by providing hexaminocyclotriphosphazene hexammonium chloride, [{NP(NH$_2$)$_2$}$_3$.6NH$_4$Cl], and formaldehyde, HCHO. At block 504, a metal salt is selected from a set of possible salts. At block 506, a molar ratio of reactants is selected. An exemplary ratio of polymers to metal salt is 1:2 respectively. At block 508, the procedure determines whether the reaction conditions are room temperature conditions. If so, the procedure continues at block 510, wherein the reactants are reacted at room temperature to form the reaction product. At room temperature conditions, the phosphazene-formaldehyde polymer is reacted with a metal salt in an aqueous environment at room temperature for 24 hours to form a reaction product at block 512.

Otherwise, if at block 508 reaction conditions are not at room temperature, the procedure continues at block 514. Under reflux conditions, the phosphazene-formaldehyde polymers are reacted with a metal and refluxed to an aqueous solution at block 514. The aqueous solution then is heated at block 516 to form a reaction product at block 512. After the operations of blocks 510 and 514, the procedure 500 continues at block 518 to isolate the desired polymer as a precipitate.

Figure 6:
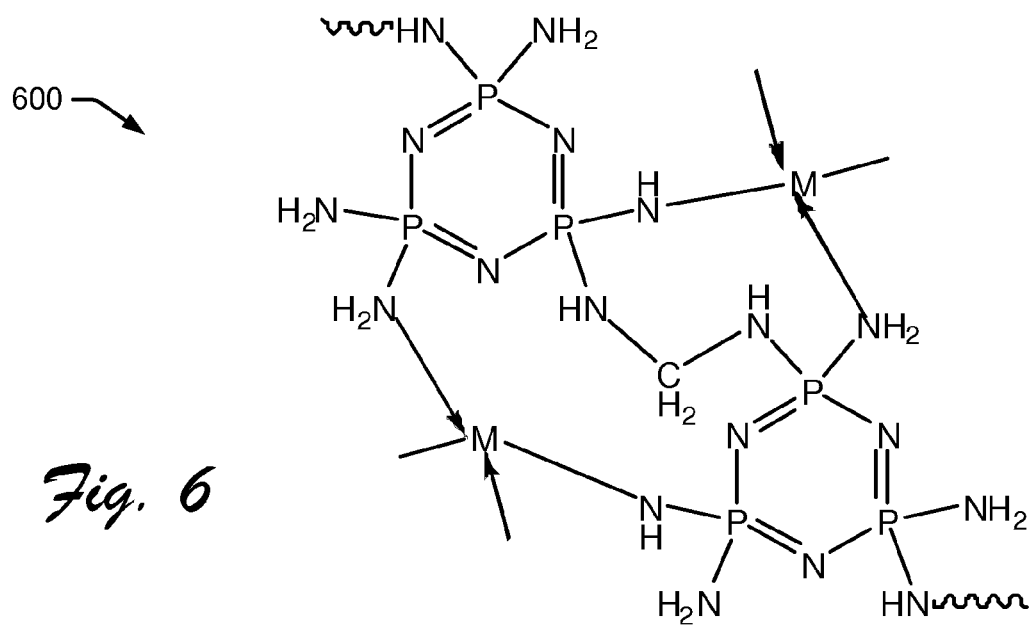
FIG. 6 shows an exemplary phosphazene-formaldehyde metal polymer complex, according to one embodiment.

FIG. 6 shows an exemplary phosphazene-formaldehyde metal polymer complex formed by the process in FIG. 5. Molar proportions and choice of reactants may affect a polymer's properties. The polymer in this embodiment has repeating units of [PN]$_3$ rings that are linked by P—X—M—X—P bonds to form a polymer. The linking subunits X are NH—CH$_2$]$_n$ and M is a metal cation. In this example, the metal cation is chosen from Mn$^{II}$, Fe$^{II}$, Co$^{II}$, Ni$^{II}$, Cu$^{II}$ and Zn$^{II}$ salts (e.g., as shown in block 504 of FIG. 5).

Figure 7:
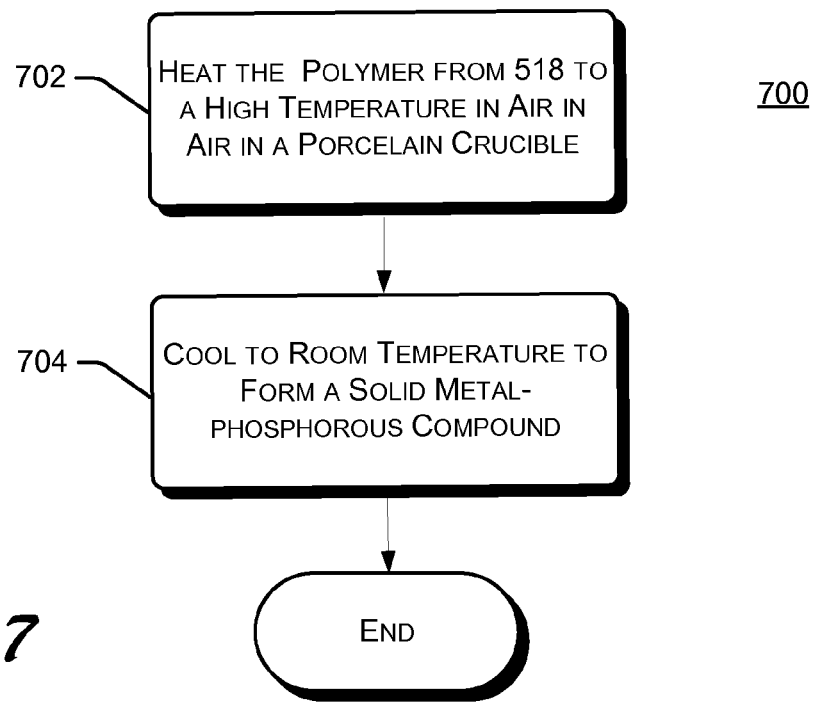
FIG. 7 shows an exemplary procedure for creating a solid-metal phosphorous compound, according to one embodiment.

FIG. 7 illustrates an exemplary procedure 700 to create a solid metal-phosphazene compound, according to one embodiment. The procedure 700 is an extension of the procedure 500 of FIG. 5. For instance, at block 702, the polymer isolated at step 518 of FIG. 5 is heated to a high temperature in an open-air porcelain crucible. At block 704, the heated polymer is cooled to form the solid-metal phosphazene compound.

EXAMPLES

The following examples and tables illustrate exemplary reaction conditions and products formed for a broad spectrum of systems. These examples and tables are not to be construed as limiting the scope of phosphazene-formaldehyde polymers and their polymer metal complexes and method of their production.

Example 1

Production of a Base Polymer

In this example, a base phosphazene-formaldehyde polymer is created by reacting 5.5 gm (0.01 mol) of [{NP(NH$_2$)$_2$}$_3$.6NH$_4$Cl] with 0.75 ml (0.01 mol) of (37% to 40%) formaldehyde at room temperature. This exothermic reaction results in a sticky paste. In this implementation, and after approximately ten minutes from the time that the paste is present, the paste is washed twice with acetone and dried at room temperature (27° C.) to provide approximately an 80% yield of white color powder of proposed polymer. There is a 4% increase in yield when the molar ratio is increased in the following way: 5.5 gm (0.01 mol) of [{NP(NH$_2$)$_2$}$_3$.6NH$_4$Cl] reacting with 2.30 ml (0.03 mol) of (37% to 40%) formaldehyde at room temperature. Additionally, when [{NP(NH$_2$)$_2$}$_3$.6NH$_4$Cl] reacts with 0.75 ml (0.01 mol) and (37% to 40%) formaldehyde 4.60 ml (0.06 mol), the product yield was 87%, due to more crosslinking with the methylene group. Increasing the amount of formaldehyde increases the amount of polymer yield because more polymer molecules crosslink.

Example 2

A Room Temperature Procedure

In this second example, a phosphazene-formaldehyde polymer and a metal salt are dissolved in distilled water. For this type of reaction, an exemplary ratio of polymer to metal salt is 1:2. This mixture is stirred for a particular amount of time, for example, 24 hours at room temperature. The precipitated solid is filtered and washed several times with ethanol and distilled water. It then is air dried at room temperature. In one implementation, this example set of operations uses hexaminocyclotriphosphazene hexammoniumchloride, [{NP(NH$_2$)$_2$}$_3$.6NH$_4$Cl], and formaldehyde [HCHO] in a 1:1 molar ratio.

Example 3

A Reflux Procedure

In this example, a phosphazene-formaldehyde polymer is synthesized, for example, as described in Example 1 and is mixed in 100 mL of distilled water are placed in a 250 mL round bottom flask fitted with a reflux condenser and refluxed for several hours (e.g., 2 hours). The resulting mixture is cooled to room temperature and the precipitated solid is filtered and washed several times with ethanol and distilled water. It then is air dried at room temperature.

Example 4

A High Temperature Procedure

In a high temperature example, a phosphazene-formaldehyde polymer like the one synthesized in Example 1 and a polymer metal complex synthesized such as in Examples 2 or 3 are heated from room temperature to a substantially high temperature (e.g., 1000° C.) in air in a porcelain crucible for a configurable amount of time (e.g., 2 hours). This heated material is allowed to cool to room temperature to form a solid metal-phosphazene compound. These compounds are insoluble in all solvents, even in aqua rezia, and too hard to crush, as a powder-like ceramic. Corresponding chemical and physical properties in this example procedure are quite different from those obtained by reacting the [{NP(NH$_2$)$_2$}$_3$.6NH$_4$Cl] with HCHO with a metal salt in an aqueous environment to form a reaction product.

Alternative Embodiments

Depending upon a particular application, the phosphazene-formaldehyde polymers and their polymer metal complexes and method of their production may be admixed with one or more additional components to modify the properties of the cured polymers, provided that such additives do not adversely affect the cure. Examples of such components include inorganic fillers such as silica, silica glass, clay, aluminum hydroxide, asbestos, mica, gypsum, kaolin, cement, talc, calcium carbonate and the like. Likewise, catalysts, stabilizers, free radical initiators, tackifiers, antioxidants, plasticizers, pigments, dyestuffs, mold release agents, and heat retardant compounds may be added to the thermosettable polymers illustrated in this detailed description. Furthermore, reactive materials and thermoplastics, when added, can optimize these polymers for various end uses.

CONCLUSION

Although the methods for the production of phosphazene-formaldehyde polymeric compounds and its metal complexes and corresponding resulting compounds have been described in language specific to structural features and/or methodological operations or actions, it is understood that the implementations defined in the appended claims are not necessarily limited to the specific features or actions described. Rather, the specific features and operations of the phosphazene-formaldehyde polymeric compounds and its metal complexes are disclosed as exemplary forms of implementing the claimed subject matter.

The invention claimed is:

1. A process for making phosphazene-formaldehyde polymer compounds, the process comprising:
   a. providing hexaminocyclotriphosphazene hexammonium chloride, [{NP(NH$_2$)$_2$}$_3$.6NH$_4$Cl], and formaldehyde, HCHO; and
   b. reacting the [{NP(NH$_2$)$_2$}$_3$.6NH$_4$Cl] with the HCHO in an aqueous environment at room temperature to form a reaction product, the reaction being a dehydration-condensation reaction and the reaction product including the phosphazene-formaldehyde polymer compounds.

2. The process of claim 1, wherein the reaction of [{NP(NH$_2$)$_2$}$_3$.6NH$_4$Cl] with formaldehyde occurs in a 1:1 molar ratio.

3. The process of claim 1, wherein the reaction of [{NP(NH$_2$)$_2$}$_3$.6NH$_4$Cl] with formaldehyde occurs in a 1:3 molar ratio.

4. The process of claim 1, wherein the reaction of [{NP(NH$_2$)$_2$}$_3$.6NH$_4$Cl] with formaldehyde occurs in a 1:6 molar ratio.

5. The process of claim 1, further comprising after the step of reacting, isolating the reaction product as precipitate.

6. A phosphazene-formaldehyde polymer compound made by the process of claim 1.

7. The phosphazene-formaldehyde polymer compound of claim 6 mixed with an additive selected from the group consisting of a catalyst, a stabilizer, a free radical initiator, a tackifier, an antioxidant, a plasticizer, a pigment, a dyestuff, a mold release agent, and a heat retardant compound.

8. A process for making a phosphazene-formaldehyde polymer metal complex, comprising
   a. providing hexaminocyclotriphosphazene hexammonium chloride, [{NP(NH$_2$)$_2$}$_3$.6NH$_4$Cl], and formaldehyde, HCHO; and
   b. reacting the [{NP(NH$_2$)$_2$}$_3$.6NH$_4$Cl] with the HCHO in an aqueous environment at room temperature to form a phosphazene-formaldehyde polymer compound, the reaction to form a phosphazene-formaldehyde polymer compound being a dehydration-condensation reaction, wherein the reacting step further comprises reacting the phosphazene-formaldehyde polymer with a metal salt in an aqueous environment to form a reaction product, the reaction product including a phosphazene-formaldehyde polymer metal complex.

9. The process of claim 8, wherein the reaction of the phosphazene-formaldehyde polymer occurs with the metal salt in a 1:2 molar ratio.

10. The process of claim 8, wherein the reaction of [{NP(NH$_2$)$_2$}$_3$.6NH$_4$Cl] with formaldehyde occurs in a 1:1 molar ratio.

11. The process of claim 8, wherein the reaction of [{NP(NH$_2$)$_2$}$_3$.6NH$_4$Cl] with formaldehyde occurs in a 1:3 molar ratio.

12. The process of claim 8, wherein the reaction of [{NP(NH$_2$)$_2$}$_3$.6NH$_4$Cl] with formaldehyde occurs in a 1:6 molar ratio.

13. The process of claim 8, wherein the metal salt is selected from the group consisting of $Mn^{II}$, $Fe^{II}$, $Co^{II}$, $Ni^{II}$, $Cu^{II}$, and $Zn^{II}$ salts.

14. The process of claim 8, wherein the reacting step with the metal salt occurs at room temperature to form the reaction product.

15. The process of claim 8, wherein the reacting step with the metal salt is refluxed to provide an aqueous solution.

16. The process of claim 15, further comprising heating the aqueous solution obtained by the refluxing step to form the reaction product.

17. The process of claim 8, further comprising isolating the reaction product as a precipitate.

18. The process of claim 8, further comprising heating the reaction product in air and then cooling the reaction product, the phosphazene-formaldehyde polymer metal complex being a solid metal-phosphorus compound.

19. A phosphazene-formaldehyde polymer metal complex made by the process of claim 8.

20. The phosphazene-formaldehyde polymer metal complex of claim 19, wherein the process further comprises heating the reaction product in air and then cooling it to form a solid metal-phosphorous compound.

* * * * *